US005298700A

United States Patent [19]

Champagne et al.

[11] Patent Number: 5,298,700

[45] Date of Patent: Mar. 29, 1994

[54] LIMIT SWITCH MODULE AND CAM FOR USE IN THE SAME

[75] Inventors: Raymond P. Champagne, Oxford; Thomas V. Catacchio, W. Brookfield; Michael A. Faticanti, Oxford, all of Mass.

[73] Assignee: Neles-Jamesbury, Inc., Worcester, Mass.

[21] Appl. No.: 828,293

[22] Filed: Jan. 30, 1992

[51] Int. Cl.[5] ........................ H01H 19/62; F16H 52/04

[52] U.S. Cl. ...................................... 200/30 R; 74/567

[58] Field of Search ................. 200/30 R, 31 R, 38 B, 200/38 BA, 307, 573, 574; 74/553, 567, 568 R

[56] References Cited

U.S. PATENT DOCUMENTS

| | | | |
|---|---|---|---|
| Re. 28,249 | 11/1974 | Estrem | 200/153 LB |
| 2,540,222 | 2/1951 | Tilton | 74/1 |
| 2,852,957 | 9/1958 | Breitenstein | 74/568 |
| 3,033,949 | 5/1962 | Hehl | 200/38 |
| 3,126,759 | 3/1964 | Cook | 74/568 |
| 3,170,330 | 2/1965 | Reinecke | 74/3.52 |
| 3,221,117 | 11/1965 | Simmons | 200/38 |
| 3,289,494 | 12/1966 | Gaffney | 74/568 |
| 3,483,344 | 12/1969 | Hermle | 200/153 |
| 3,569,992 | 3/1971 | Papa, Jr. | 200/38 |
| 3,678,225 | 7/1972 | Hulterstrum | 200/38 |
| 3,678,780 | 7/1972 | Ponting | 74/568 R |
| 3,699,291 | 10/1972 | Danti et al. | 200/153 L |
| 3,737,597 | 6/1973 | Jones et al. | 200/38 |
| 3,839,925 | 10/1974 | Ficken et al. | 74/568 |
| 3,852,542 | 12/1974 | Rogers et al. | 200/31 R |
| 3,958,087 | 5/1976 | Mol et al. | 200/17 R |
| 3,980,852 | 9/1976 | Redfield | 200/153 LB |
| 4,031,339 | 6/1977 | Koch | 200/38 BA |
| 4,112,265 | 9/1978 | Crepeau et al. | 200/31 R |
| 4,238,654 | 12/1980 | Hermle | 200/153 LB |
| 4,822,964 | 4/1989 | Koch | 200/303 |
| 4,841,110 | 6/1989 | Amonett | 200/574 |
| 4,861,949 | 8/1989 | Bortolloni et al. | 200/5 R |
| 4,889,964 | 12/1989 | Pea et al. | 200/31 R |
| 4,923,325 | 5/1990 | Howie, Jr. | 403/361 |
| 4,939,320 | 7/1990 | Graulty | 200/17 R |

FOREIGN PATENT DOCUMENTS 2291602 6/1976 France .

OTHER PUBLICATIONS

Westlock Controls Corp. Advertisement Brochure, Accutrak 2000, Westlock introduces the Dual Display Monitor, Saddle Brook, N.J.

*Primary Examiner*—A. D. Pellinen
*Assistant Examiner*—Michael A. Friedhofer
*Attorney, Agent, or Firm*—Oblon, Spivak, McClelland, Maier & Neustadt

[57] ABSTRACT

A modular housing structure for rotatably positioning a cam on a shaft at a predetermined position relative to a limit switch. The modular housing includes upper and lower halves which are snap-fit together by an arrangement of projections and recesses which interconnect the housing halves, and hold a limit switch and a rotating cam in a fixed position relative to one another. Additionally, each limit switch module of the invention may be snap-fit onto the top or bottom of an adjacent limit switch module such that a number of modules may conveniently and easily be aligned along a single shaft. The cam rotatably received in each module is unitarily formed of a single material, and includes an inner spring collar which is deflected slightly when a shaft is inserted through the cam. The spring collar exerts a restoring force on the shaft sufficient to grip the shaft tightly enough to ensure rotation of the cam with the shaft, but loosely enough to allow manual adjustment of the angular position of the cam relative to the shaft. The inside surface of the spring collar is smooth, thus permitting infinite angular adjustment relative to the shaft.

26 Claims, 7 Drawing Sheets

LIMIT SWITCH MODULE AND CAM FOR USE IN THE SAME

BACKGROUND OF THE INVENTION

1. Field of the Invention

The present invention relates to a limit switch which is normally maintained in a closed position so that an electrically rotatable device, such as a valve, is moved in response to an electrical control signal. The limit switch is tripped at a predetermined position of the valve to open the circuit, and to thereby interrupt a supply of power to the movable device.

2. Discussion of the Background

As described in U.S. Pat. No. 4,939,320 to Graulty, it is a conventional practice to use micro or limit switches to control the positioning of a rotatable valve at a selected one of its opened and closed conditions. Typically, two angularly displaced cams are integrally formed or rigidly attached on a shaft which is coupled for rotation with a rotatable stem of a valve. As the shaft rotates in either a clockwise or counterclockwise direction with the valve stem, the actuating cams will move either clockwise or counterclockwise along a path which brings one or the other of the cams into contact with one or the other of the limit switches, thereby interrupting a supply of electrical current to a motor driven valve, and stopping movement of the valve at either its open or closed position. The same cams and limit switches can be used to turn on or turn off status signals which represent the open or closed status of the motor driven valve.

However, as also discussed in the patent to Graulty, most of the prior art arrangements require complicated procedures to set up the angular orientation of the cams relative to their mounting shafts to ensure actuation of the limit switches at the desired position of the valve being controlled. Also, the setup must periodically be examined, and readjusted if necessary.

The patent to Graulty discloses an invention including cam members which are frictionally mounted on a rotating shaft. In a first embodiment of the Graulty invention, the cam members are preferably composed of a plastic material while the shaft is made of a metal material. However, in high temperature or low temperature environments, the friction fit of the parts is altered due to their different thermal expansion coefficients. Thus, the Graulty invention is only suited to a narrow range of temperatures. Although Graulty discloses a second embodiment of his invention for use in high temperature environments, a complex arrangement of springs, washers, annular shoulders, and nuts is necessary to supply a frictional force sufficient to cause the cam members to rotate along with the shaft.

Consequently, a need exists for a simplified cam/shaft interface which supplies an appropriate frictional force between the shaft and the cam at a wide range of temperatures.

Additionally, a need exists for an apparatus which can easily be assembled and disassembled without a need for special tools, and which can be calibrated by manual adjustment after complete assembly.

SUMMARY OF THE INVENTION

Accordingly, one object of this invention is to provide a novel unitary cam having a spring collar formed of the same material as the cam and having a spring constant capable of frictionally engaging a rotating shaft at a wide range of temperatures.

It is another object of the invention to provide the spring collar with a smooth inner surface for contact with the shaft so that the cam is manually adjustable to an infinite number of angular positions with respect to the shaft.

It is another object of the invention to provide a limit switch and a cam which are assembled into a single module wherein assembly of the module does not require separate fasteners or tools.

A still further object of the invention is to provide a plurality of modules having an arrangement of interconnecting projections and recesses for combining the modules without the use of separate fasteners or tools.

In a preferred embodiment of the limit switch module of the present invention, the module includes upper and lower halves which are snap-fit together. A cam and a limit switch are sandwiched between the upper and lower halves at a fixed distance from one another. The cam includes a spring collar, integrally molded therewith, to tightly (but adjustably) grip a shaft. Preferably, the upper and lower halves, the cam, and the shaft are all of the same material. They may, for example, each be injection molded polyoxymethylene (polyacetal).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
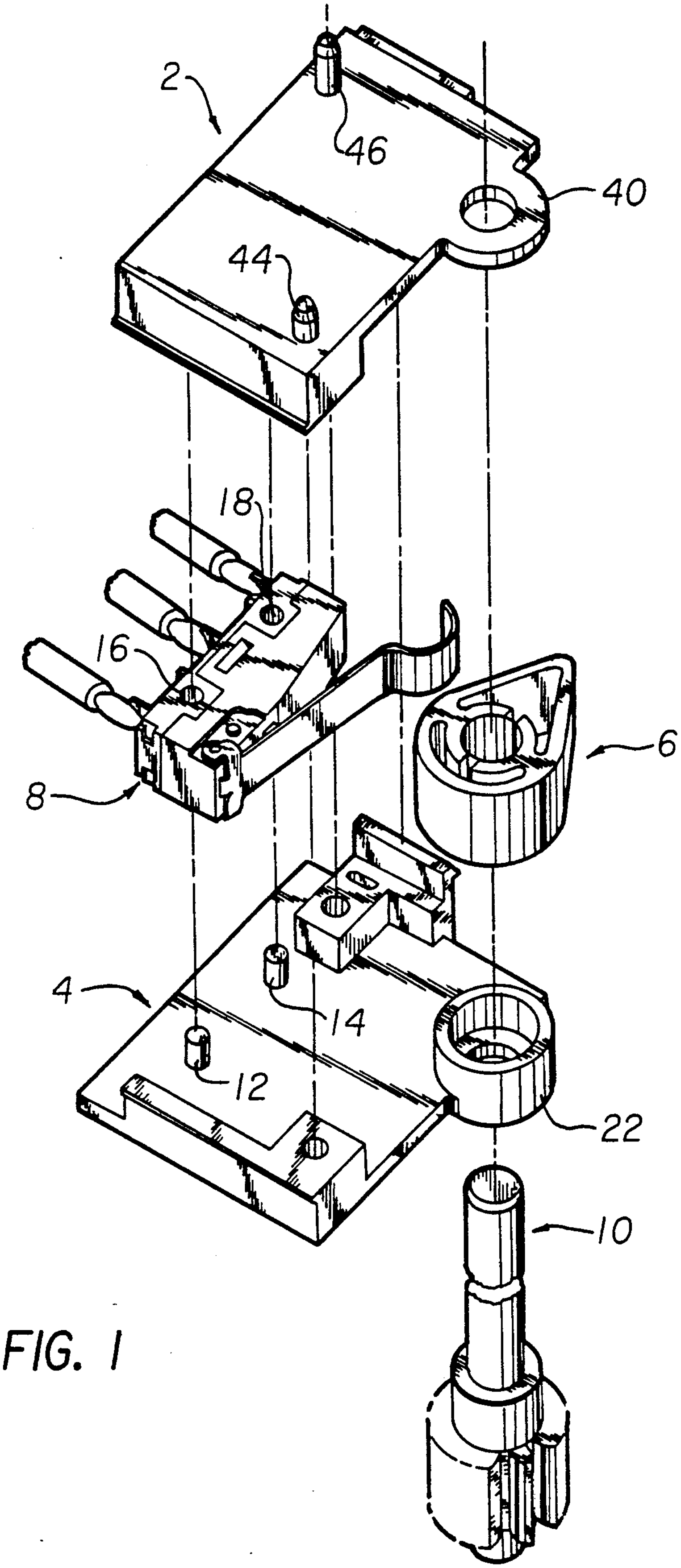
FIG. 1 is an expanded view showing the assembly of a single limit switch module according to the present invention.

Referring now to the drawings, wherein like reference numerals designate identical or corresponding parts throughout the several views, and more particularly to FIG. 1 thereof, a limit switch module according to the present invention includes an upper half 2, a lower half 4, a cam 6, and a limit switch 8. The cam 6 and limit switch 8 are sandwiched between the upper and lower halves when they are snapped together, and a hole is formed in each of upper half 2, cam 6, and lower half 4 for receiving a shaft 10 therethrough.

Figure 2:
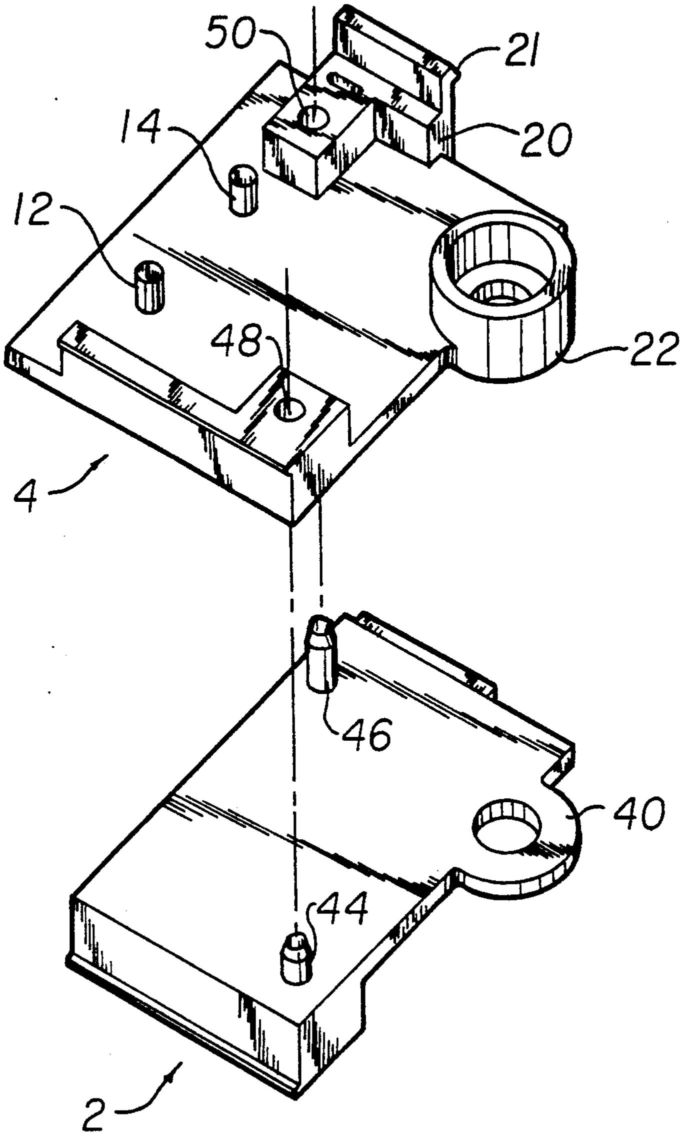
FIG. 2 is a perspective view showing how the upper half of the module of FIG. 1 may be snap-fit to the lower half of an adjacent module.

FIG. 2 shows how the lower half 4 of an adjacent module is received by the upper half 2 shown in FIG. 1.

As shown in FIGS. 1 and 2, lower half 4 includes a first arrangement of projections including pegs 12 and 14, which are received in throughholes 16 and 18 of limit switch 8, respectively. Lower half 4 is further provided with a second arrangement of projections, which, in the preferred embodiment of the invention, includes a pawl member 20 having an enlarged end 21. Additionally, lower half 4 is formed with a cylindrical bearing 22 for receiving cam 6 and shaft 10.

Figure 3:
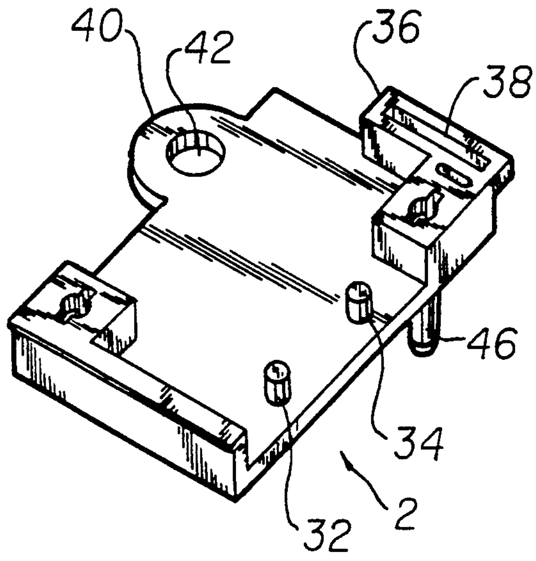
FIG. 3 is a bottom view of the upper half of the module shown in FIG. 1.

FIG. 3 provides a bottom view of upper half 2. As can be seen in FIGS. 1 and 3, upper half 2 includes a pair of pegs 32, 34, similar to pegs 12 and 14 of lower half 4, which are received in throughholes 16 and 18 of limit switch 8, respectively. Upper half 2 is further provided with a pawl receiving member 36 having a rectangular throughhole 38 for receiving pawl member 20 of lower half 4 in an interlocking relationship. A semicircular projection 40 is provided on upper half 2 for holding cam 6 in place on cylindrical bearing 22 when the upper and lower halves are assembled. The semicircular projection 40 has a throughhole 42 formed therein for rotatably receiving the shaft 10 therethrough.

A short pin 44 and a long pin 46 are provided on an upper surface of upper half 2. As can be seen in FIG. 2, when two modules are to be interconnected, short pin 44 is received by a throughhole 48 formed through lower half 4 of the adjacent module. Likewise, long pin 46 is received in a throughhole 50.

Figure 4:
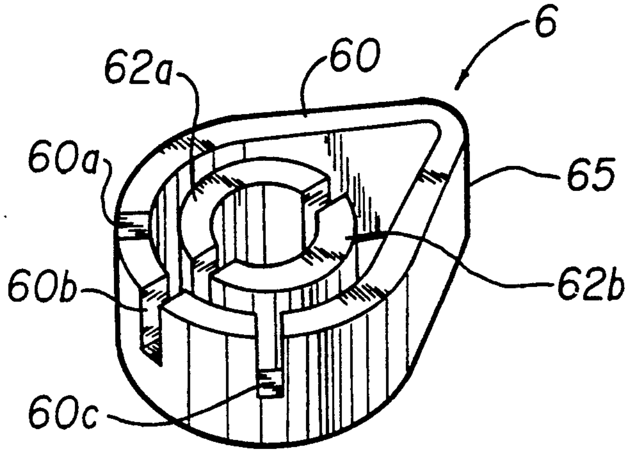
FIG. 4 is a perspective view showing one embodiment of a cam for use in the module of FIG. 1.
Figure 5:
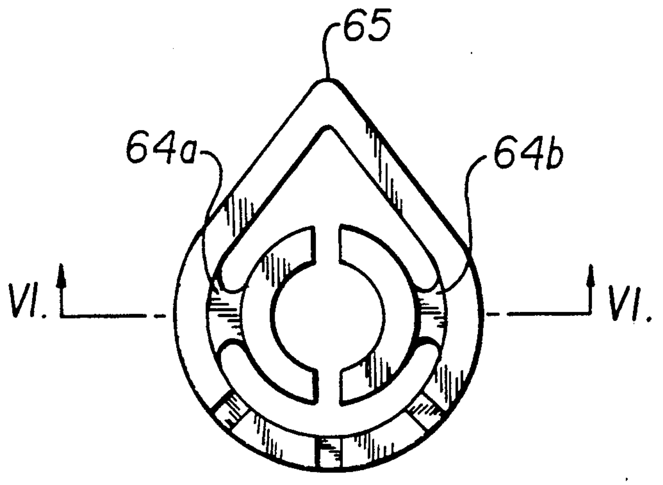
FIG. 5 is a top view of the cam of FIG. 4.
Figure 6:
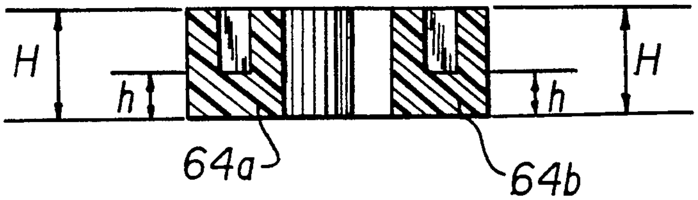
FIG. 6 shows the cam in cross section as viewed from the line VI—VI shown in FIG. 5.

FIG. 4 shows a perspective view of cam 6. In the preferred embodiment of the invention, cam 6 is injection molded as a single unitary piece. The cam can be formed, for example, from a resin material such as polyoxymethylene (polyacetal), as is available from DuPont under the trade name DELRIN. As can be seen in FIG. 4, the preferred embodiment of the cam is configured to have an outer ring 60 having a tear-drop shape. Spring collar segments 62*a* and 62*b* are connected to outer ring 60 by separate joining webs 64*a* and 64*b*, which can be seen in FIGS. 5 and 6. As shown in the cross section shown in FIG. 6, the separate joining webs 64*a*, 64*b* have a reduced axial height h compared to the axial height H of outer ring 60 and spring collar segments 62*a*, 62*b*. As can be seen in FIG. 5, separate joining webs 64*a*, 64*b* also extend only around a small portion of the periphery of spring collar segments 62*a*, 62*b*. Accordingly, spring collar segments 62*a*, 62*b* flex slightly when a shaft 10 is received between the spring collar segments. When the spring collar segments 62*a*, 62*b* are flexed, the separate joining webs 64*a*, 64*b* exert a restoring force, holding the spring collar segments in a tight frictional engagement with shaft 10. Accordingly, when cam 6 is placed on a shaft, rotation of the shaft will also result in rotation of cam 6. However, since the outer surface of shaft 10 and the inner surfaces of spring collar segments 62*a*, 62*b* contacting the shaft are smooth, cam 6 may also be rotated relative to shaft 10 to adjust the position of a large radius portion 65 of the cam 6 relative to the shaft 10. Preferably, the axial height h and the circumferential length of spring collar segments 62*a* and 62*b* are designed so that cam 6 may be slid axially along a shaft and angularly adjusted relative to the shaft without the need for special tools. However, it may also be desirable to provide outer ring 60 with a plurality of slots 60*a*–60*c* (see FIG. 4), into which a screw driver or a similar tool may be inserted to provide additional leverage for adjusting cam 6 angularly with respect to shaft 10.

Figure 7A:
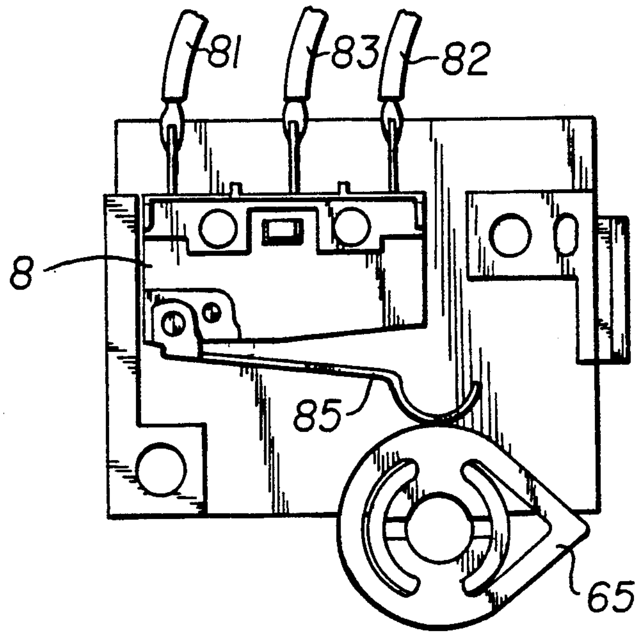
FIG. 7A illustrates a first position of the cam wherein the limit switch is not actuated.
Figure 7B:
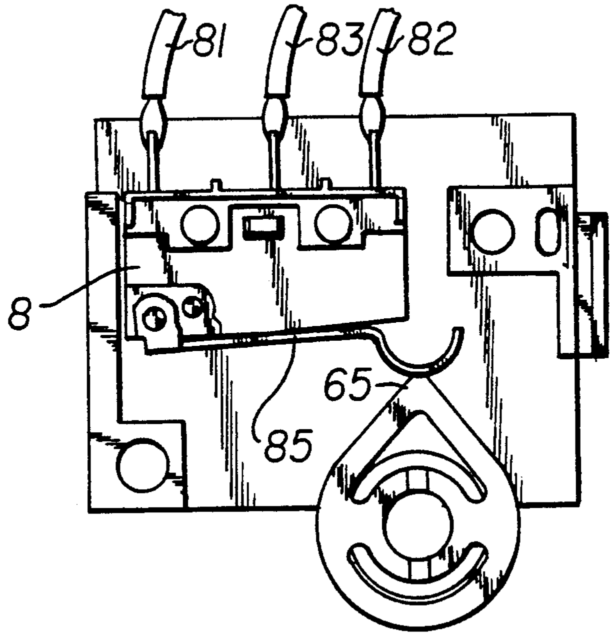
FIG. 7B shows a second position of the cam wherein the limit switch is actuated.

FIGS. 7A and 7B illustrate the operation of the limit switch of the present invention. The limit switch 8 is a commercially available microswitch, typical of those available from several manufacturers. Limit switch 8 may, for example be an AV series subminiature switch, available from Matsushita Corporation of Japan. As used in the present invention, such a switch includes a common ground wire 81, a power supply wire 82, and an indicator wire 83. An actuating lever 85 is biased to the position shown in FIG. 7A. In this position, power flows in through common ground wire 81 and out through power supply wire 82, as indicated by the arrows in FIG. 7A. However, when cam 6 is rotated by shaft 10 to the position shown in FIG. 7B, the circuit between common ground wire 81 and power supply wire 82 is interrupted. Instead of flowing out through power supply wire 82, electricity is diverted through indicator wire 83, as shown by the arrows in FIG. 7B. Accordingly, power supply wire 82 can be used to supply electrical power to a motor which drives the shaft 10 shown in FIGS. 1 and 8–10. When shaft 10 rotates to a predetermined position indicated in FIG. 7B, large radius portion 65 of cam 6 moves actuating lever 85 of the limit switch 8, thereby interrupting the supply of current through power supply wire 82, and initiating a supply of current through indicator wire 83. Indicator wire 83 may, for example, supply current to a lamp which indicates that the cam 6 has reached the predetermined position. The predetermined position can be adjusted by rotating cam 6 relative to shaft 10, either manually or with a screw driver using slots 60*a*–60*c*. Thus, the apparatus may be easily calibrated so that the predetermined position of cam 6 is representative of a status of a piece of equipment driven by shaft 10. The piece of equipment may, for example, be a motor driven valve, whose opened and closed positions are separated by a 90° angular rotation of shaft 10.

Figure 9:
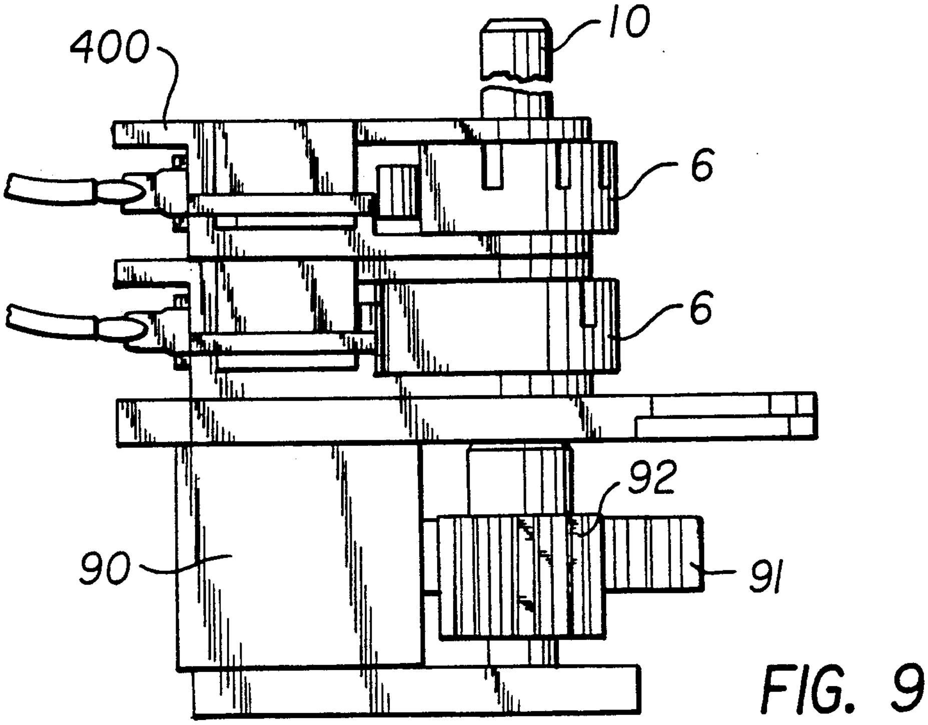
FIGS. 9 and 10 show actuators employing two limit switch modules and four limit switch modules, respectively.

FIG. 9 shows a valve actuator employing two limit switch modules of the present invention. Shaft 10 is driven by a motor 90 by way of gears 91 and 92. An upper cam 6 is adjusted so that power to motor 90 will be interrupted at a first position of shaft 10. A lower cam 6 is adjusted so that when the direction of rotation of shaft 10 is reversed, the cam will interrupt supply of power to motor 90 at a second predetermined position of shaft 10. One cam 6 can be positioned to represent an opened position of the valve, for example, and the other cam 6 can be positioned to represent a closed position of the valve.

Figure 10:
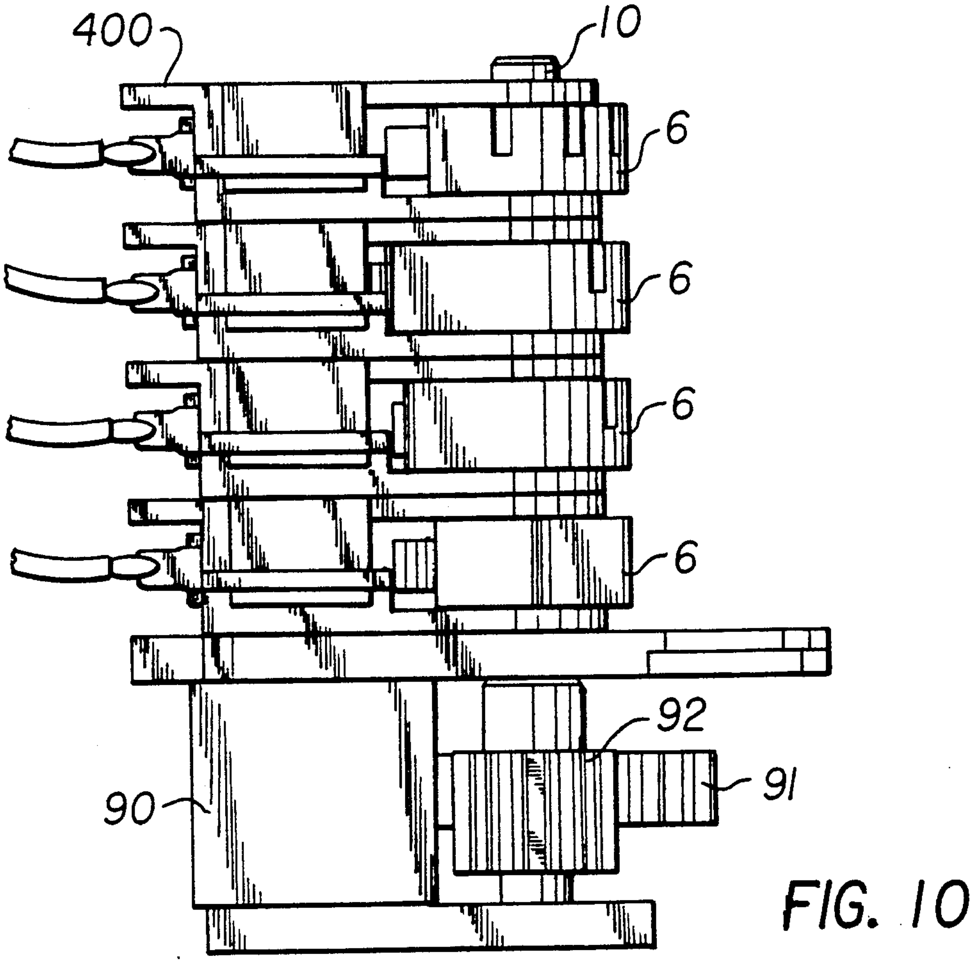

FIG. 10 represents an actuator having four modules. Each of the four cams 6 can be adjusted relative to shaft 10 such that opened and closed or on and off positions of two separate devices can be controlled by a single shaft 10.

The configuration of the present invention is especially advantageous because the parts of the invention can be assembled and disassembled without the necessity of any special tools. Accordingly, the assembly of a limit switch module according to the present invention is now described.

Figure 8:
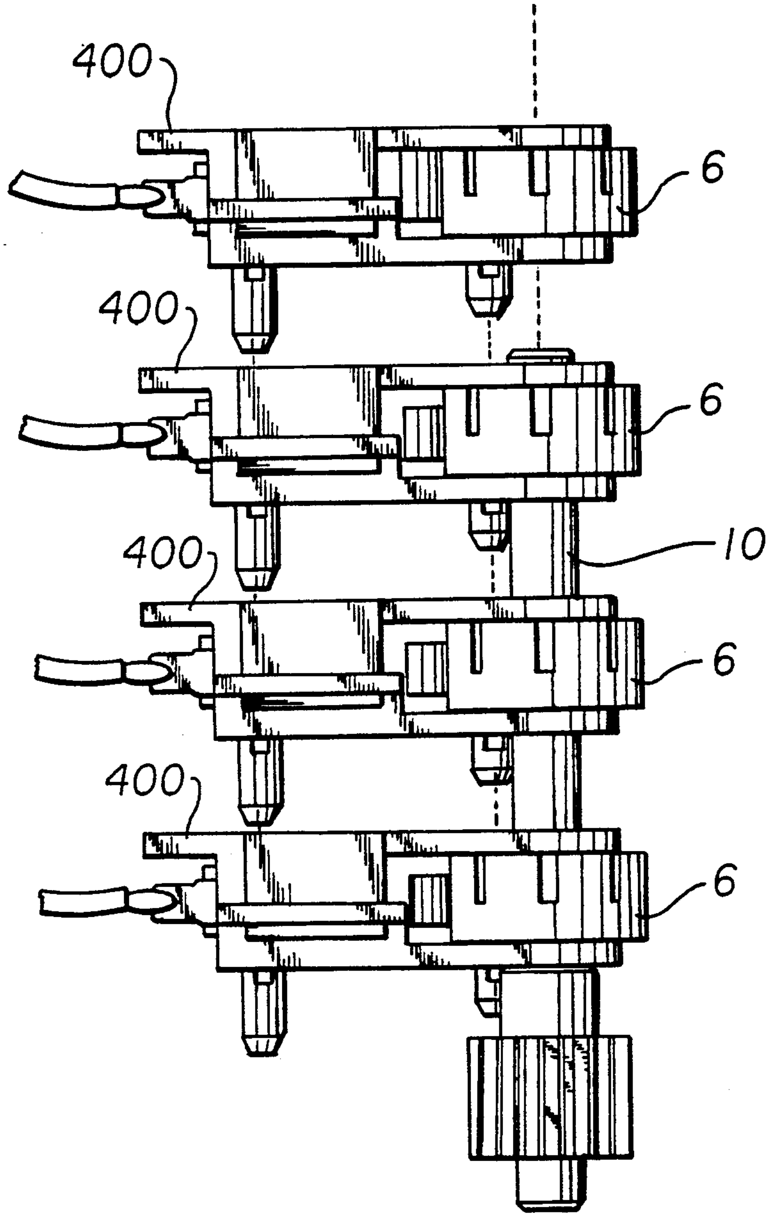
FIG. 8 is an expanded view illustrating how a plurality of limit switch modules are assembled on a single shaft.

In order to assemble the limit switch module, lower half 4 is positioned as shown in FIG. 1, and a limit switch 8 is pressed down onto the pegs 12, 14. A cam 6 is then positioned on the cylindrical bearing 22 such that the cylindrical bearing is received between the outer ring 60 and the spring collar segments 62*a*, 62*b* of the cam 6. The pegs 32, 34 of upper half 2 are then aligned with bores 16 and 18, and upper half 2 is pressed down onto lower half 4, while ensuring that the pawl member 20 is received within pawl receiving member 36. The shaft 10 is then inserted through throughhole 42, cam 6, and cylindrical bearing 22. The shaft 10 may also be fed through additional limit switch modules, as shown in FIG. 8. It should, at this time, be noted that the terms "upper half" and "lower half" have been used only for convenience, and that the entire module can be turned upside down when placed on shaft 10. Note that in FIGS. 8–10, each module is oriented with lower half 4 on top of upper half 2. As can also be seen in FIGS. 8–10, each lower half 4 includes an electrically insulating shield 400, which extends between adjacent sets of electrical connections.

As can be appreciated from the above disclosure, the entire apparatus of the present invention is assembled simply and easily without the use of tools and without worry with regard to the position of the cam 6 relative to shaft 10 during assembly. Calibration of the individual cams 6*a*–6*d* can be delayed until after an actuator is entirely assembled and connected to the device being controlled, and calibration also does not require special tools.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A limit switch module, comprising:

a lower housing half separatably interconnected with a limit switch by a first arrangement of manually separatable and connectable snap-together projections and recesses;

an upper housing half separatably interconnected with at least one of said first housing half and said limit switch with a second arrangement of manually separatable and connectable snap-together projections and recesses;

means for rotatably receiving a cam between said upper and lower housing halves at a predetermined distance from said limit switch;

means for rotatably receiving a shaft and aligning the shaft for engagement with said cam;

wherein said means for rotatably receiving a cam includes a cylindrical bearing provided on one of said upper and lower housings halves, said cam including a spring collar integral with the cam for fictionally receiving a shaft;

said spring collar further including smooth inner surface means for providing infinitely variable angular adjustment relative to said shaft.

2. A limit switch module according to claim 1, wherein one of said upper and lower housings is provided with an electrically insulating shield for electrically isolating electrical connections of said first limit switch module from electrical connections of said second limit switch module.

3. The limit switch module according to claim 1, wherein said second arrangement of recesses and projections includes a pawl-like projection provided on one of said upper and lower housings and a rectangular through hole provided in the other of said upper and lower housings for receiving said pawl-like projection.

4. The limit switch module according to claim 1, wherein each of said upper and lower housings includes a plurality of pegs for removable insertion into said limit switch.

5. The limit switch module of claim 1, further including a third arrangement of manually separatable and connectable snap-together projections and recesses for interconnecting the top of the upper housing of a first limit switch module with the bottom of the lower housing of a second limit switch module.

6. A limit switch module, comprising:

a modular housing mounting a limit switch therein;

a cam rotatably mounted in said housing at a predetermined distance from said limit switch, said cam having a large radius portion for actuating said switch when said cam is rotated to a predetermined position relative to said housing;

a shaft for rotating said cam; and a spring collar means, integrally molded with and from the same material as said cam, said spring collar means for supplying a large enough restoring force on said shaft to ensure rotation of said cam with said shaft, and wherein said restoring force is small enough to permit manual adjustment of an angular position of said cam relative to said shaft.

7. The limit switch module according to claim 6, wherein said spring collar means includes smooth inner surface means for providing infinitely variable manual angular adjustment relative to said shaft.

8. The limit switch module according to claim 6, wherein said cam has a plurality of slots formed therein for insertion of a tool to aid in adjustment of the cam relative to the shaft.

9. The limit switch module according to claim 6, wherein said cam includes an outer ring forming said large radium portion, said outer ring being joined with said spring collar by a web unitarily molded with said outer ring and said spring collar.

10. The limit switch module according to claim 6, wherein said modular housing includes upper and lower halves which are snap-fit together with a first arrangement of manually separate projections and recesses.

11. The limit switch module according to claim 10, wherein said upper and lower halves include a second arrangement of manually separable projections and recesses for separatably interconnecting a first limit switch module with a second, limit switch module.

12. The limit switch module according to claim 6, wherein one of said upper and lower halves includes a cylindrical bearing for insertion between the collar and the outer ring of said cam to position said cam at said predetermined distance relative to said limit switch.

13. The limit switch module of claim 6, wherein said shaft includes a circular cross-section which is received by said spring collar means.

14. A limit switch module, comprising:

a module housing mounting a limit switch therein;

a cam rotatably mounted in said housing at a predetermined distance from said limit switch, said cam having a large radium portion for actuating said switch when said cam is rotated to a predetermined position relative to said housing;

a shaft for rotating said cam; and a spring collar integrally molded with and from the same material as said cam, wherein said spring collar includes a plurality of collar segments, each collar segment having an axial length along a longitudinal axis of said shaft and an arcuate length extending in an arc partially around the circumference of said shaft.

15. The limit switch module according to claim 14, wherein each of said collar segments is connected to said outer ring by a separate web, each said separate web having an axial length smaller than the axial length of each of said collar segments.

16. The limit switch module according to claim 15, wherein each said separate web has an arcuate length smaller than the arcuate length of said collar segments.

17. A unitarily molded cam, comprising:

a continuous outer ring, having a thickness, an axial height, and a non-uniform outer diameter; and a discontinuous inner ring formed by a plurality of collar segments each connected to said outer ring by a separate joining web, said collar segments each having an axial height, an arcuate length, and a thickness;

wherein the axial height of said outer ring is substantially equal to the axial height of each of said collar segments, and wherein said separate joining webs have an axial height substantially shorter than the axial height of said collar segments so as to provide an elastic restoring force to each of said collar segments when said segments are deflected by a shaft inserted in said discontinuous inner ring.

18. The unitarily molded cam of claim 17, wherein the axial height of said separate joining webs is less than half the axial height of said collar segments.

19. The unitarily molded cam of claim 17, wherein said outer ring has a plurality of axial slits extending a partial distance along the axial height of said outer ring.

20. The unitarily molded cam according to claim 17, wherein said inner ring has a smooth inner surface, so as to provide an infinitely variable angular adjustment relative to said shaft.

21. The unitarily molded cam of claim 17, wherein said outer ring is substantially tear-drop shaped.

22. The unitarily molded cam of claim 17, wherein the thickness of said collar segments is substantially equal to the thickness of said outer ring.

23. The unitarily molded cam of claim 17, wherein the cam is injection molded polyoxymethylene (polyacetal).

24. The unitarily molded cam of claim 17, wherein said separate joining webs each have an arcuate length much less than the arcuate length of said collar segments.

25. A limit switch module comprising:

a housing mounting a limit switch therein;

a protruding cylindrical bearing within said housing, said cylindrical bearing protruding from an inner surface of said housing;

a cam rotatably mounted within said housing with said cylindrical bearing projecting into said cam such that said cylindrical bearing is at least partially disposed interiorly of a cam surface of said cam, said cam including a collar extending into an interior of said cylindrical bearing; and a shaft extending into said collar of said cam for rotating said cam.

26. The limit switch module of claim 25, wherein said collar is a spring collar means for applying a spring force to said shaft, such that said cam rotates with said shaft.

* * * * *